United States Patent Office 3,239,509
Patented Mar. 8, 1966

3,239,509
**3-DESOXY-Δ⁴-ANDROSTENE 17-TETRAHYDRO-
PYRANYL ETHERS**
Alexander D. Cross, Mexico City, Mexico, assignor to
Syntex Corporation, Panama, Panama, a corporation
of Panama
No Drawing. Filed Aug. 4, 1964, Ser. No. 387,508
9 Claims. (Cl. 260—239.55)

The invention relates to novel cyclopentanopolyhydrophenanthrene derivatives and to processes for the preparation thereof.

More particularly, this invention relates to novel 17-tetrahydropyranyl ethers of 3-desoxy-Δ⁴-androstenes and 19-nor-3-desoxy-Δ⁴-androstenes represented by the general formula:

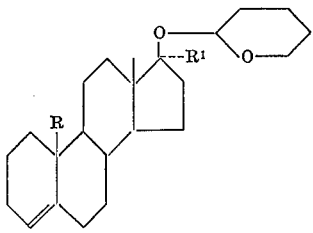

In the above formula R represents hydrogen or methyl, $R^1$ represents hydrogen, a lower alkyl group, such as methyl, ethyl, propyl and the like, a lower alkenyl group, e.g., vinyl or the like, or a lower alkynyl group, e.g., ethynyl or the like.

The novel 3-desoxy-Δ⁴-androstene and 19-nor-3-desoxy-Δ⁴-androstene 17-tetrahydropyranyl ethers represented by the above general formula exhibit enhanced anabolic activity, as compared to the corresponding 17-unetherified compounds, when administered orally. In addition, the androgenic activity of these 17β-tetrahydropyranyloxy derivatives is low. Thus, when their anabolic/androgenic activity is measured by administering them orally to castrated young male rats and then determining the response to this treatment by increases in the weights of the ventral prostate, seminal vesicles and levator ani muscle, it is found that these 17-tetrahydropyranyl ethers possess very low androgenic activity, while their anabolic activity is markedly greater than that of testosterone.

These novel 17-tetrahydropyranyl ethers also possess anti-estrogenic activity, lower blood cholesterol levels, and inhibit the secretion of gonadotrophins by the pituitary gland. In addition, they are useful in fertility control, especially when $R^1$ in the above general formula represents a lower alkynyl group, e.g., an ethynyl group.

The 3-desoxy-Δ⁴-androstene and 19-nor-3-desoxy-Δ⁴-androstene 17-tetrahydropyranyl ethers of the present invention are obtained from the corresponding 17β-hydroxy steroids by conventional methods of preparing tetrahydropyranyl ethers of steroids having free hydroxyl groups. Thus, the free 17β-hydroxyl containing parent compound can be reacted, under substantially anhydrous conditions, with an excess of dihydropyran in the presence of a small amount of an acidic catalyst, e.g., hydrochloric acid, p-toluenesulfonic acid, boron trifluoride etherate, and the like, either alone or together with an inert organic solvent, such as benzene, diethyl ether, or the like, at a temperature of from about 0° C. to about 50° C., and preferably at room temperature (about 25° C.), for from about 30 minutes to about 24 hours.

A convenient method of obtaining the 17α-lower alkyl-alkenyl- and alkynyl-substituted 3-desoxy-Δ⁴-androstene and 19-nor-3-desoxy-Δ⁴-androstene starting materials employed in preparing the novel 17-tetrahydropyranyl ethers of the present invention can be illustrated schematically as follows:

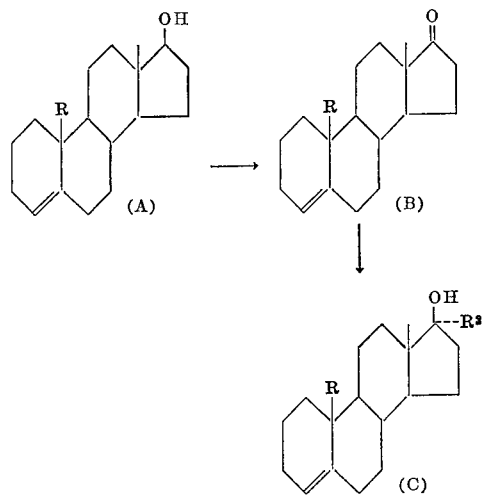

In these formulas R is as described for Formula I hereinabove and $R^2$ represents a lower alkyl, alkenyl or alkynyl group.

In carrying out this method, Δ⁴-androsten-17β-ol (A; R=methyl) or 19-nor-Δ⁴-androsten-17β-ol (A; R=hydrogen) is oxidized, for example using chromium trioxide in pyridine at room temperature for from about 12 hours to about 18 hours, to give the corresponding 17-one, i.e., Δ⁴-androsten-17-one (B; R=methyl) or 19-nor-Δ⁴-androsten-17-one (B; R=hydrogen).

These 17-ones can then be converted to the corresponding 17α-lower alkyl, alkenyl and alkynyl-17β-hydroxy derivatives by conventional methods. Thus, for example, Δ⁴-androsten-17-one or 19-nor-Δ⁴-androsten-17-one can be refluxed in thiophene-free benzene, under substantially anhydrous conditions, with a lower alkyl, alkenyl or alkynyl magnesium halide, such as methyl, vinyl or ethynyl magnesium bromide, or the like, for about 3 hours or longer. Similarly, the starting 17-one, dissolved in absolute diethyl ether, can be reacted under a nitrogen atmosphere with a lower alkyl, alkenyl or alkynyl lithium compound, such as ethyl lithium, vinyl lithium, ethynyl lithium, or the like, for 48 hours or longer at room temperature. The starting 17-one can also be dissolved in anhydrous benzene containing potassium-t-amylate and reacted under a nitrogen atmosphere with gaseous acetylene at room temperature for 40 hours or longer to give the corresponding 17α-ethynyl-17β-hydroxy derivative, which can then be hydrogenated by known methods to the corresponding 17α-vinyl or 17α-ethyl derivative.

The novel 17β-tetrahydropyranyloxy compounds of the present invention can be administered in any of a number of conventional pharmaceutical forms, and particularly in one suited for oral administration, e.g., in solid form, such as in pills, powders, capsules, tablets, or the like, or in liquid form, as syrups, emulsions, suspensions, and the like.

In order that those skilled in the art can more fully understand the present invention, the following examples are set forth. These examples are given solely for the purpose of illustrating the invention, and should not be considered as expressing limitations unless so set forth in the appended claims.

PREPARATION A

A solution of 6 grams of Δ⁴-androsten-17β-ol in 120 cc. of pyridine was added to a mixture of 6 grams of chromium trioxide in 120 cc. of pyridine, and this reaction mixture was then allowed to stand at room temperature overnight. Following this reaction period the reaction mixture was diluted with ethyl acetate and filtered through Celite. The filtrate was washed thoroughly with water, dried over anhydrous sodium sulfate, and evaporated to dryness. Crystallization from acetone/hexane gave $\Delta^4$-androsten-17-one.

This procedure was repeated in every detail but one, namely, $\Delta^4$-androsten-17$\beta$-ol was replaced by 19-nor-$\Delta^4$-androsten-17$\beta$-ol, to give 19-nor-$\Delta^4$-androsten-17-one.

PREPARATION B

A solution of 5 grams of $\Delta^4$-androsten-17-one in 250 cc. of thiophene-free benzene was admixed with 27.5 cc. of a 4 N solution of methylmagnesium bromide in diethyl ether. The resulting reaction mixture was refluxed, with the exclusion of moisture, for 3 hours, then cooled and cautiously treated with an excess of aqueous ammonium chloride solution. Next, the product was isolated by extraction with ethyl acetate, and the extract was then washed with water, dried over anhydrous sodium sulfate and evaporated to dryness. Recrystallization of the dry residue from methylene chloride-hexane gave 17$\alpha$-methyl-$\Delta^4$-androsten-17$\beta$-ol.

By repeating this procedure in every detail but one, namely, replacing the methylmagnesium bromide with equivalent amounts of vinylmagnesium bromide and ethynylmagnesium bromide, 17$\alpha$-vinyl-$\Delta^4$-androsten-17$\beta$-ol and 17$\alpha$-ethynyl-$\Delta^4$-androsten-17$\beta$-ol, respectively, were obtained.

Similarly, by using 19-nor-$\Delta^4$-androsten-17-one in place of $\Delta^4$-androsten-17-one and treating it with methylmagnesium bromide, 17$\alpha$-methyl-$\Delta^4$-androsten-17$\beta$-ol was obtained.

PREPARATION C

A solution of 10 molar equivalents of ethynyl lithium in 50 cc. of diethyl ether was added dropwise, with stirring, to a solution of 2 grams of 19-nor-$\Delta^4$-androsten-17-one contained under a nitrogen atmosphere, and when the addition was complete the reaction mixture was stirred for an additional 48 hours at room temperature. Following this reaction period the reaction mixture was poured into water and the resulting mixture was acidified with hydrochloric acid and stirred vigorously for 1 hour. Next, the ether layer was separated, washed with water until neutral, dried over anhydrous sodium sulfate, filtered, and then evaporated to dryness. Recrystallization of the dry residue from acetone/hexane gave 17$\alpha$-ethynyl-19-nor-$\Delta^4$-androsten-17$\beta$-ol.

PREPARATION D

A solution of 1 gram of 17-ethynyl-19-nor-$\Delta^4$-androsten-17$\beta$-ol in 40 cc. of pyridine was admixed with 400 mg. of pre-hydrogenated 2% palladium-on-calcium carbonate catalyst and then hydrogenated at room temperature and atmospheric pressure until 1.1 molar equivalents of hydrogen had been absorbed. At this point the reaction was stopped and the catalyst was separated by filtration through Celite and washed with ethyl acetate. These washings were then added to the filtrate, and the combined solution was evaporated to dryness under vacuum to give the crude vinyl derivative. This crude product was then dissolved in ethyl acetate, and the resulting solution was washed with dilute hydrochloric acid and water until neutral, dried over anhydrous sodium sulfate and evaporated to dryness. Recrystallization of the dry residue from acetone gave 17$\alpha$-vinyl-19-nor-$\Delta^4$-androsten-17$\beta$-ol.

*Example*

To a solution of 1 gram of $\Delta^4$-androsten-17$\beta$-ol (3-desoxytestosterone) in 25 cc. of benzene there was added 2 cc. of dihydropyran. Next, approximately 5 cc. of the mixture of benzene and dihydropyran was distilled off to remove moisture, and the remaining mixture was then cooled to room temperature. To the cooled mixture there was then added 0.1 gram of p-toluenesulfonic acid, and the resulting reaction mixture was held at room temperature for 12 hours. Following this reaction period the reaction mixture was washed with an aqueous 5% sodium carbonate solution and then with water until neutral, then dried over anhydrous sodium sulfate and evaporated to dryness. The dry residue was then chromatographed by passing it, dissolved in hexane, through a column of neutral alumina, thus giving the 17-tetrahydropyranyl ether of $\Delta^4$-androsten-17$\beta$-ol (17$\beta$-tetrahydropyranyloxy-$\Delta^4$-androstene).

By repeating this procedure in every detail but one, namely, replacing $\Delta^4$-androsten-17$\beta$-ol with 17$\alpha$-methyl-$\Delta^4$-androsten-17$\beta$-ol, 17$\alpha$-vinyl-$\Delta^4$-androsten-17$\beta$-ol, 17$\alpha$-ethynyl-$\Delta^4$-androsten-17$\beta$-ol, 19-nor-$\Delta^4$-androsten-17$\beta$-ol, 17$\alpha$-methyl-19-nor-$\Delta^4$-androsten-17$\beta$-ol, 17$\alpha$-vinyl-19-nor-$\Delta^4$-androsten-17$\beta$-ol and 17$\alpha$-ethynyl-19-nor-$\Delta^4$-androsten, respectively, the corresponding 17 - tetrahydropyranyl ethers, namely, 17$\alpha$-methyl-17$\beta$-tetrahydropyranyloxy-$\Delta^4$-androstene - 17$\alpha$-vinyl-17$\beta$-tetrahydropyranyloxy - $\Delta^4$-androstene, 17$\alpha$-ethynyl-17$\beta$-tetrahydropyranyloxy-$\Delta^4$-androstene, 17$\beta$-tetrahydropyranyloxy - 19 - nor-$\Delta^4$-androstene, 17$\alpha$-methyl-17$\beta$ - tetrahydropyranyloxy-19-nor-$\Delta^4$-androstene, 17$\alpha$-vinyl-17$\beta$-tetrahydropyranyloxy - 19-nor-$\Delta^4$-androstene, and 17$\alpha$-ethynyl-17$\beta$-tetrahydropyranyloxy-19-nor-$\Delta^4$-androstene, respectively, were obtained.

It will be obvious to those skilled in the art that other changes and variations can be made in carrying out the present invention without departing from the spirit and scope thereof as defined in the appended claims.

I claim:

1. A compound represented by the formula:

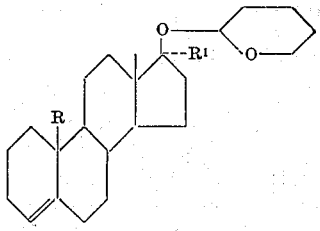

wherein R is selected from the group consisting of hydrogen and methyl and $R^1$ is selected from the group consisting of hydrogen, a lower alkyl group, a lower alkenyl group and a lower alkynyl group.

2. The 17-tetrahydropyranyl ether of $\Delta^4$-androsten-17$\beta$-ol.

3. The 17-tetrahydropyranyl ether of 17$\alpha$-methyl-$\Delta^4$-androsten-17$\beta$-ol.

4. The 17-tetrahydropyranyl ether of 17$\alpha$-vinyl-$\Delta^4$-androsten-17$\beta$-ol.

5. The 17-tetrahydropyranyl ether of 17$\alpha$-ethynyl-$\Delta^4$-androsten-17$\beta$-ol.

6. The 17-tetrahydropyranyl ether of 19-nor-$\Delta^4$-androsten-17$\beta$-ol.

7. The 17-tetrahydropyranyl ether of 17$\alpha$-methyl-19-nor-$\Delta^4$-androsten-17$\beta$-ol.

8. The 17-tetrahydropyranyl ether of 17$\alpha$-vinyl-19-nor-$\Delta^4$-androsten-17$\beta$-ol.

9. The 17-tetrahydropyranyl ether of 17$\alpha$-ethynyl-19-nor-$\Delta^4$-androsten-17$\beta$-ol.

No references cited.

LEWIS, GOTTS, *Primary Examiner.*